United States Patent
Green

(10) Patent No.: US 9,827,921 B1
(45) Date of Patent: Nov. 28, 2017

(54) SYSTEMS AND METHODS OF PROTECTING VEHICLE CARGO AREAS

(71) Applicant: Wallace K. Green, Bellingham, WA (US)

(72) Inventor: Wallace K. Green, Bellingham, WA (US)

(*) Notice: Subject to any disclaimer, the term of this patent is extended or adjusted under 35 U.S.C. 154(b) by 0 days.

(21) Appl. No.: 15/413,250

(22) Filed: Jan. 23, 2017

(51) Int. Cl.
*B60R 13/02* (2006.01)
*B60R 13/01* (2006.01)

(52) U.S. Cl.
CPC ........ *B60R 13/0206* (2013.01); *B60R 13/011* (2013.01)

(58) Field of Classification Search
CPC .................................................. B60R 13/0206
USPC ............. 296/39.1, 39.2; 297/188.04, 188.06, 297/188.2, 390–410; 224/275, 560; 248/215, 307, 340
See application file for complete search history.

(56) References Cited

U.S. PATENT DOCUMENTS

| | | | |
|---|---|---|---|
| 4,673,207 A | 6/1987 | Reynolds et al. | |
| 4,877,281 A | 10/1989 | Altmann | |
| 4,943,105 A | 7/1990 | Kacar et al. | |
| 4,979,772 A | 12/1990 | Carey et al. | |
| 5,419,602 A | 5/1995 | VanHoose | |
| 5,791,614 A * | 8/1998 | Sims | B60R 7/10 224/275 |
| 6,116,485 A * | 9/2000 | Watkins | B60R 11/04 224/275 |
| 6,206,443 B1 | 3/2001 | Konop et al. | |
| 6,478,355 B1 | 11/2002 | Eden et al. | |
| 6,536,827 B2 | 3/2003 | Oswald et al. | |
| 6,595,568 B1 | 7/2003 | Schroeder et al. | |
| 6,619,717 B2 | 9/2003 | Gardiner | |
| 6,692,054 B2 | 2/2004 | Vitoorapakom | |
| 7,219,944 B2 * | 5/2007 | Klotz | B60R 5/04 105/423 |
| 7,597,373 B2 | 10/2009 | McAuliffe | |
| 7,784,864 B2 * | 8/2010 | Feder | B60R 7/043 297/188.03 |
| 8,430,441 B2 | 4/2013 | Waterman | |
| 8,777,073 B2 * | 7/2014 | Sanchez | B60R 7/10 224/275 |
| 9,539,949 B2 * | 1/2017 | Nuako | B60R 7/043 |
| 9,586,529 B1 * | 3/2017 | Sanchez | B60R 7/043 |
| 2003/0178869 A1 | 9/2003 | Adams | |
| 2007/0194589 A1 * | 8/2007 | Aliev | B60R 11/00 296/39.1 |
| 2013/0020824 A1 * | 1/2013 | Tinterow | B60H 1/00592 296/24.46 |
| 2013/0068809 A1 * | 3/2013 | Wang | B60R 11/02 224/275 |

FOREIGN PATENT DOCUMENTS

DE 10011216 7/2010
WO 1995004671 A1 2/1995

* cited by examiner

*Primary Examiner* — Dennis H Pedder
(74) *Attorney, Agent, or Firm* — Michael R. Schacht; Schacht Law Office, Inc.

(57) ABSTRACT

A cargo area protection system for a vehicle defining a cargo area and comprising a seat assembly has a sheet member and a spreader member. The spreader member is arranged to engage at least a portion of the seat assembly. The sheet member is supported by the spreader member such that at least a supported portion of the sheet member is in a desired position with respect to the cargo area.

14 Claims, 10 Drawing Sheets

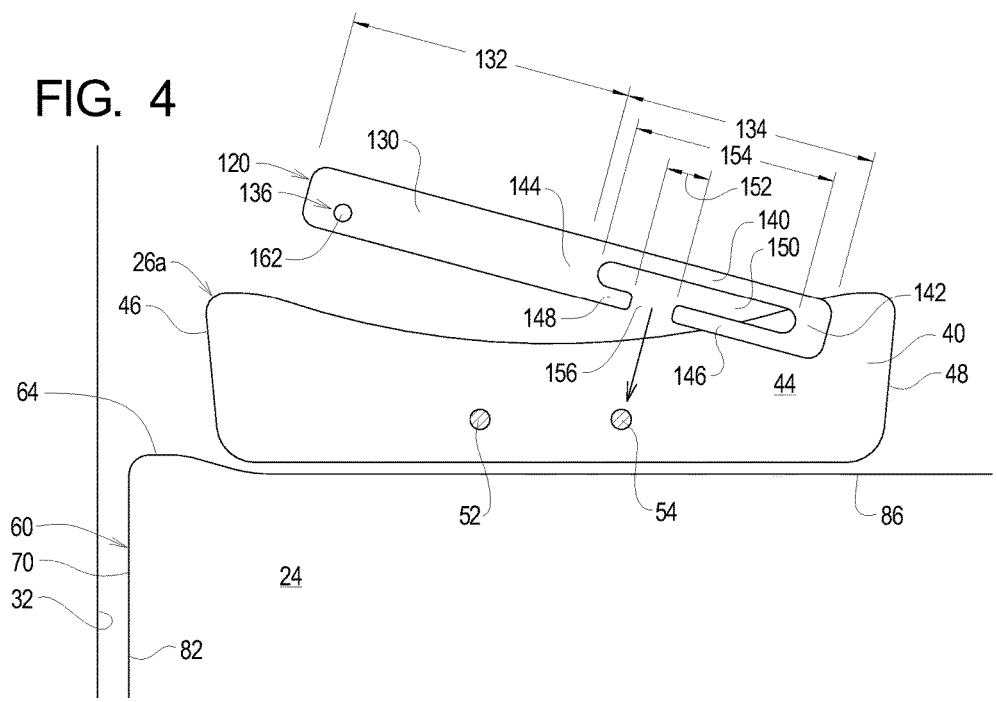
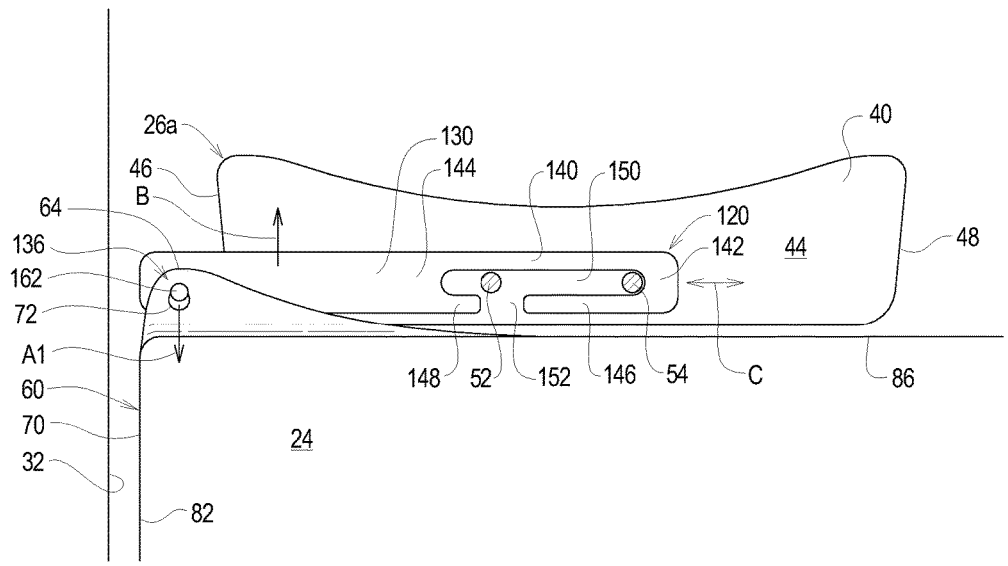

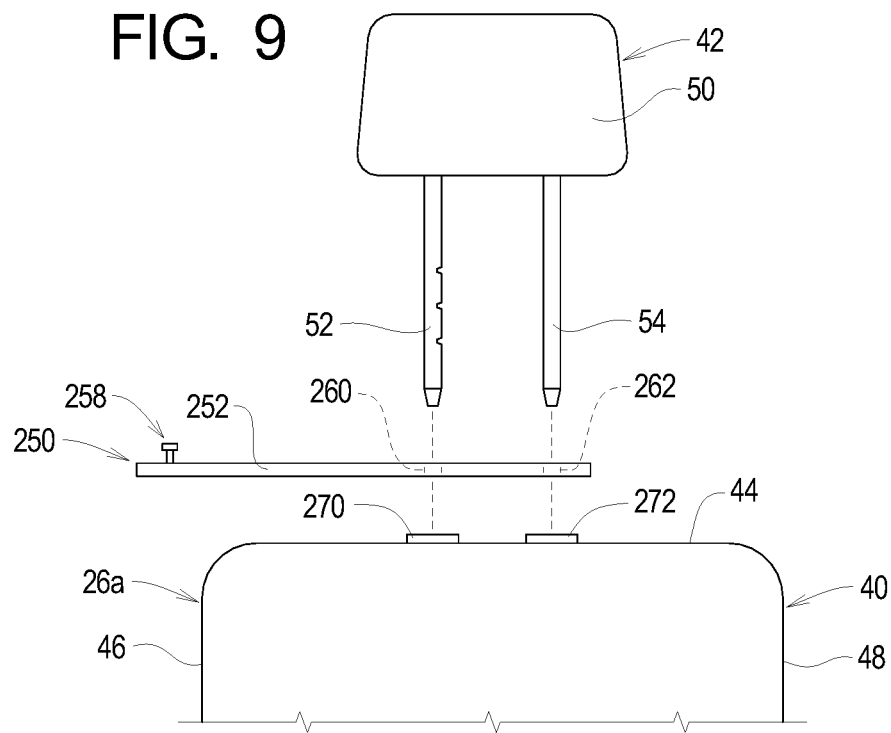
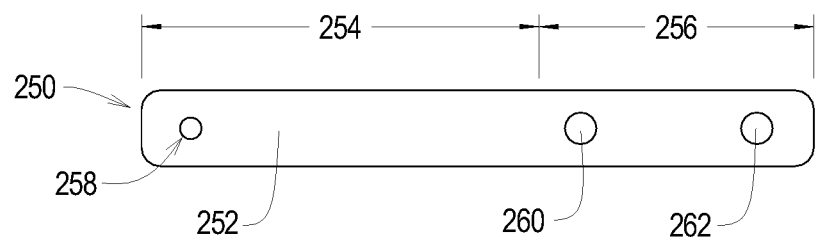
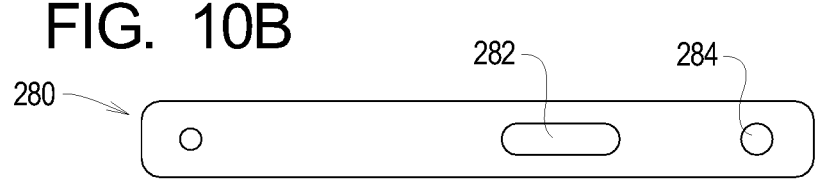

SYSTEMS AND METHODS OF PROTECTING VEHICLE CARGO AREAS

TECHNICAL FIELD

The present invention relates to systems and methods for protecting the cargo areas of vehicles and, more specifically, to protective systems and methods that support a sheet of material to inhibit contamination of and/or damage to vehicles while transporting loads.

BACKGROUND

Vehicles are typically designed for a primary use but are often used for one or more secondary uses. For example, a sedan is designed primarily for the transportation of seated passengers, but can be used to transport loads such as furniture, electronics, and the like.

Certain passenger vehicles, such as sport utility vehicles (SUVs), vans, station wagons, hatchbacks, and the like, may define a cargo area designed to facilitate the transportation of both seated passengers and loads. Many of these vehicles can even be reconfigured from a first configuration to accomplish a first goal to a second configuration to accomplish a second goal. For example, certain vehicles allow rear seats to be folded or removed to facilitate the transportation of loads such as furniture and the like.

The present invention is of particular significance when applied to vehicles that have a defined cargo area and to vehicles that can be reconfigured to define a cargo area or to enhance a cargo area. The principles of the present invention are also of particular significance when applied to interior cargo areas but may have application to exterior cargo areas such as those defined by trucks.

Certain loads, referred to herein as "loose loads", tend to contaminate the cargo area of a vehicle, especially when that cargo area is within the vehicle. Grass clippings, bark, dirt, and other loose materials forming a loose load can easily fall into cracks and crevices defined by the vehicle interior or contaminate fabrics and other materials defining the surfaces of the vehicle interior. Other types of loads, such as metal filing cabinets, may damage the interior surfaces of the vehicle during loading and unloading.

To protect the vehicle interior from contamination and/or surface damage, a tarp, mat, or other material may be arranged within the vehicle interior. For example, arranging a tarp within the rear of an SUV may allow the transportation of loose materials without significant contamination of the vehicle interior.

The use of a sheet of material within a vehicle can be problematic. If the sheet of material is rigid, the sheet likely will need to be customized for the shape of a particular vehicle and may be difficult to store when not in use. If the sheet of material is flexible, it may be difficult to arrange the sheet of material to provide optimal protection of the vehicle interior.

The need exists for improved systems and methods for protecting the cargo area of a vehicle.

SUMMARY

The present invention may be embodied as a cargo area protection system for a vehicle defining a cargo area and comprising at least one seat assembly, the cargo area protection system comprising a sheet member and at least one spreader member. The at least one spreader member is arranged to engage at least a portion of the at least one seat assembly. The sheet member is supported by the spreader member such that at least a supported portion of the sheet member is in a desired position with respect to the cargo area.

The present invention may also be embodied as a method of protecting a cargo area of a vehicle comprising at least one seat assembly comprising the following steps. At least one spreader member is arranged to engage at least a portion of the at least one seat assembly. The sheet member is supported with the spreader member such that at least a supported portion of the sheet member is in a desired position with respect to the cargo area.

The present invention may also be embodied as a spreader member for supporting a sheet member relative to a cargo area of a vehicle comprising at least one seat assembly comprising a head restraint defining inner and outer support posts, the spreader member comprising an engaging portion, a spacer portion, and a support portion. The spacer portion extends from the engaging portion. The support portion is on the spacer portion. The engaging portion is arranged to engage the inner and outer support posts of the at least one seat assembly such that the outer support post is between the support portion and the inner support post. The support portion supports a supported portion of the sheet member such that the supported portion of the sheet member is in a desired position with respect to the cargo area.

BRIEF DESCRIPTION OF THE DRAWINGS

FIGS. 4 and 5 are a top plan cutaway views illustrating the formation of a first example spreader system during the installation of first example cargo area protection system within the first example vehicle;

FIG. 9 is a rear elevation exploded view of a second example spreader system that may be used to form part of an example cargo area protection system of the present invention;

FIG. 10A is a top plan view of a fourth example spreader member that may be used to form the second example spreader system of the present invention;

FIG. 10B is a top plan view of a fifth example spreader member that may be used to form the second example spreader system of the present invention;

DETAILED DESCRIPTION

Figure 1:
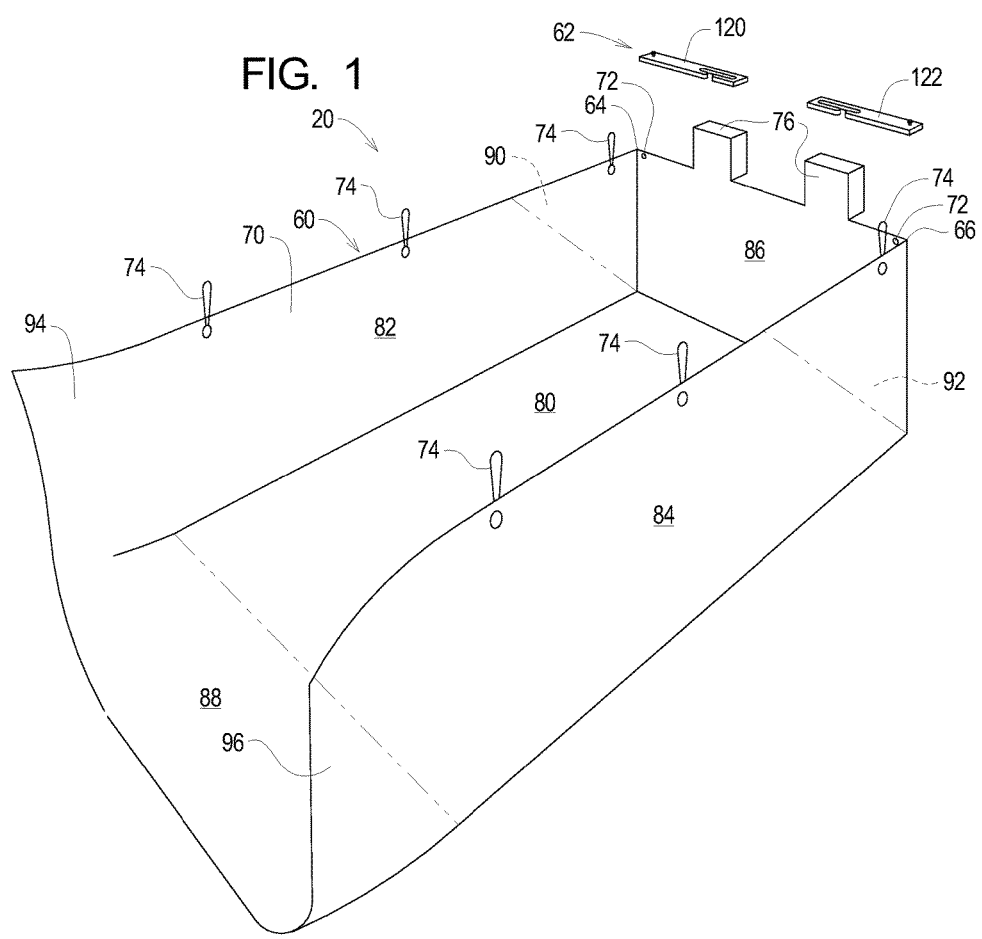
FIG. 1 is an exploded, somewhat schematic perspective view of a first example cargo area protection system of the present invention.

Referring initially to FIG. 1 of the invention, depicted therein is an example cargo area protection system 20 constructed in accordance with, and embodying, the principles of the present invention. The example cargo area protection system 20 is adapted for use with a vehicle 22 defining a cargo area 24 and comprising seat assemblies 26. The example cargo area protection system 20 is designed to support a load 28 within the cargo area 24 in a manner that inhibits damage to and contamination of the interior of the vehicle 22. The example vehicle 22 and load 28 are not per se part of the present invention and will be described herein only to that extent helpful for a complete understanding of the construction and operation of the present invention.

Figure 2:
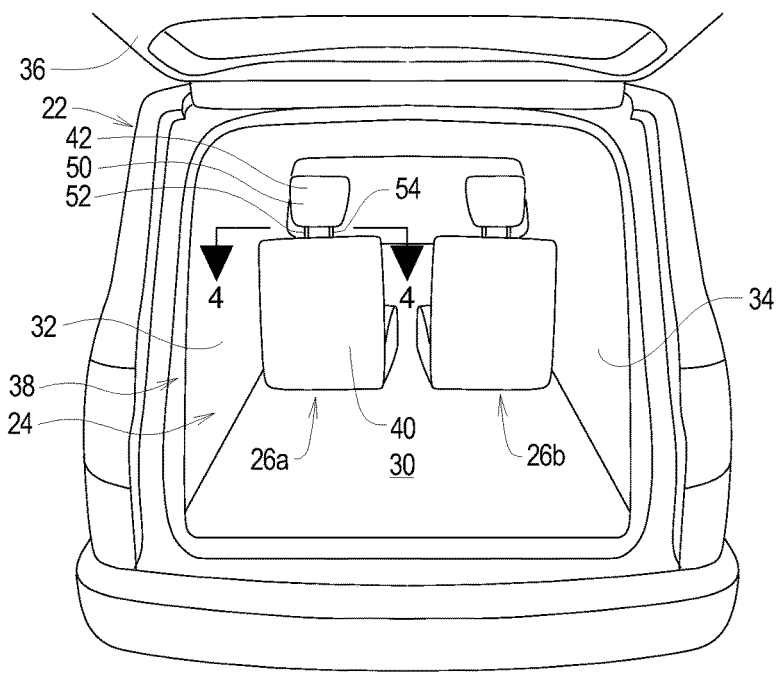
FIG. 2 is a rear view of a first example vehicle prior to installation of the first example cargo area protection system.
Figure 3:
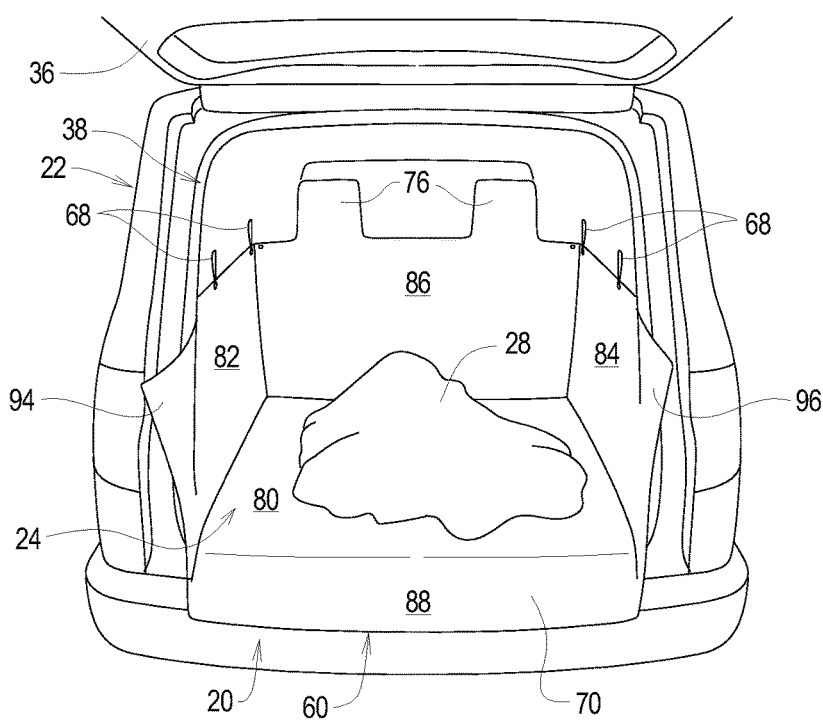
FIG. 3 is a rear view of the first example vehicle after installation of the first example cargo area protection system.

The example vehicle 22 is a station wagon, van, or SUV defining a floor surface 30, a first side wall 32, a second side wall 34, and a cargo door 36. The example cargo area 24 is defined by the seat assemblies 26, the floor surface 30, the first side wall 32, the second side wall 34, and, when closed, the cargo door 36. The example vehicle 22 defines a cargo opening 38 that allows access to the cargo area 24 when the cargo door 36 is open as shown in FIGS. 2 and 3. The example cargo door 36 is hinged to swing upwards but can be hinged to swing outward or downward.

The example seat assemblies 26 are or may be conventional. The example vehicle 22 comprises two of the seat assemblies 26 in the configuration shown in FIGS. 2 and 3. From the perspective of the example cargo area protection system 20, the example seat assemblies 26 are mirror images of each other but are otherwise the same. The reference character "26" will be used to refer to the seat assemblies in general, and the appendices "a" and "b" will be used to refer to the left and right seat assemblies. In that context, only one of the seat assemblies 26 will be described in detail herein, with the understanding that that description applies to both of the seat assemblies depicted in FIGS. 2 and 3.

In particular, FIGS. 4 and 5 illustrate that the example seat assemblies 26 each define a seat back 40 and a head restraint 42. The seat back 40 defines an upper surface 44, an outer side surface 46, and an inner side surface 48. The example head restraint 42 comprises a restraint body 50 and outer and inner support posts 52 and 54. The terms "outer" and "inner" as used herein refer to locations with respect to a centerline of the vehicle 22. The inner side surfaces 48 of the seat assemblies 26 will face each other, and the inner support posts 54 will be adjacent to each other. The support posts 52 and 54 are adapted to engage the seat back 40 in a conventional manner to detachably attach the head restraint 42 at a desired location relative to the seat back 40.

The example cargo area protection system 20 comprises an example sheet assembly 60 and a first example spreader system 62. The first example spreader system 62 is arranged to support first and second upper corner edges 64 and 66 of the sheet assembly 60 to hold the example sheet assembly 60 in a desired orientation within the cargo area 24 as will be described in further detail below. The first example spreader system 62 engages the support posts 52 and 54 of the head restraints 42 to support the first and second upper corner edges 64 and 66 adjacent to the first and second side walls 32 and 34 of the vehicle 22 to prevent the sheet assembly 60 from collapsing inwardly and minimizing effective use of the cargo area 24. The example sheet assembly 60 is further optionally supported relative to the seat assemblies 26 and to the interior of the vehicle at attachment locations 68 (four of which are visible in FIG. 3) as will be described in further detail below.

With the forgoing general understanding of the construction and operation of the example cargo area protection system 20 in mind, the details of the example sheet assembly and first example spreader system 62 will now be described in further detail.

The example sheet assembly 60 comprises a sheet member 70, first sheet connectors 72, second sheet connectors 74, and pockets 76. The second sheet connectors 74 and pockets 76 are optional and may be omitted from the cargo area protection system 20 of the present invention. The example first sheet connectors 72 are detachably attached to the spreader system 62 to support the sheet assembly 60. The example second sheet connectors 74 are detachably attached to the attachment locations 68 as will be described in further detail below. The example pockets 76 are sized and dimensioned to receive the restraint bodies 50 of the head restraints 42.

The example sheet member 70 is a flexible sheet of material appropriate for supporting the types of load 28 to be placed into the cargo area 24. For example, if the load 28 contains moisture, the material forming the sheet material 70 is desirably configured to prevent migration of moisture through the sheet material 70. If the load 28 comprises fine particles, the material forming the sheet material 70 should be configured to prevent migration of the fine particles through the sheet material 70. If the load 28 is sharp or jagged, the material forming the sheet material 70 should have sufficient strength to prevent tearing when supporting the load 28. Ideally, the material forming the sheet member 70 should be relatively durable and inexpensive and have a desirable combination of factors such as water resistance, material containment, and tear resistance.

The example sheet member 70 may be rectangular in shape and oversized relative to the area of the floor surface 30. In this case, the example sheet member is arranged to cover the floor surface 30 and folded to extend at least partly along the first and second side walls 32 and 34, the seat back 40, and the cargo door 36 (when closed). Alternatively, the sheet member 70 may be a rectangle of material that is pre-folded and sewn to accommodate a particular cargo area form factor. As another example, the sheet member 70 may be cut into an irregular (non-rectangular) shape and then sewn into a shape that accommodates a particular cargo area form factor.

In any event, when installed within and supported relative to the cargo area 24 as shown in FIG. 3, the example sheet member 70 defines a bottom section 80 that covers the floor surface 30, a first side section 82 that extends at least partly over the first side wall 32, a second side section 84 that extends at least partly over the second side wall 34, a forward end section 86 that extends at least partly over the seat backs 40, and a rear end section 88 that extends at least partly over the load 28 adjacent to the cargo door 36 when the cargo door 36 is closed.

The example sheet member 70 is a rectangular sheet of material and further defines a first forward corner section 90 at the juncture of the first side section 82 and the forward end section 86, a second forward corner section 92 at the juncture of the second side section 84 and the forward end section 86, a first rear corner section 94 at the juncture of the first side section 82 and the rear end section 88, and a second rear corner section 96 at the juncture of the second side section 84 and the rear end section 88. The terms "forward" and "rear" refer to the direction of travel of the vehicle 22 but may be reversed for a different vehicle configuration.

The example first sheet connectors 72 are arranged near an upper edge of the forward end section 86 of the sheet member 70 adjacent to the first and second forward corner sections 90 and 92. The example second sheet connectors 74 are arranged along edges of the first and second side sections 82 and 84 of the sheet member 70. The example pockets 76 are sewn along an upper edge of the forward end section 86 of the sheet member 70 and spaced from each other approximately the same distance as the head restraints 42.

The first and second upper corner edges 64 and 66 supported by the spreader system 62 may alternatively be referred to as supported portions of the example sheet member 70.

Turning now to FIGS. 1, 4, 5, and 6A, the first example spreader system 62 will now be described in further detail. As shown in FIG. 1, the first example spreader system 62 comprises first and second spreader members 120 and 122. The example spreader members 120 are mirror images of each other, and only the example first spreader member 120 will be described herein in detail with the understanding that the second spreader member 122 is constructed and used in substantially the same manner.

The example first spreader member 120 comprises a spreader body 130 defining a spacer portion 132, an engaging portion 134, and a support portion 136. The example engaging portion 134 comprises an extension portion 140, an inner end portion 142, an outer end portion 144, an inner finger portion 146, and an outer finger portion 148. An engaging slot 150 is defined by the extension portion 140, the inner end portion 142, the outer end portion 144, the inner finger portion 146, and the outer finger portion 148. A slot opening 152 is defined between ends of the inner and outer finger portions 146 and 148. The example engaging slot 150 defines a slot length 154, and the example slot opening 152 defines an opening length 156. The example support portions 136 are adapted to be detachably attached to supported portions (e.g., corner edges 64 and 66) of the sheet member 70 using the sheet connectors 72 as will be described in further detail below. The example spreader body 130 may be an assembly of separate parts or may be made of a unitary material such as injection molded plastic.

The example first spreader member 120 is supported by the outer and inner support posts 52 and 54 of the left seat assembly 26a and the second spreader member 122 is supported by the outer and inner support posts 52 and 54 of the right seat assembly 26b. The first sheet connectors 72 in the first and second corner edges 64 and 66 are then arranged to engage the support portions 136 on the first and second spreader members 120 and 122 to support the corner edges 64 and 66 adjacent to the spreader members 120 and 122. Because the first and second spreader members 120 and 122 are supported by the support posts 52 and 54 at substantially the level of the seat upper surfaces 44, the corner edges 64 and 66 are thus supported adjacent to the first and second side walls 32 and 34 above the floor surface 30.

To form the first example spreader system 62, the example spreader member 120 is displaced such that the inner support post 54 passes through the slot opening 152 and into the engaging slot 150 as shown in FIG. 4. The example spreader member 120 is then displaced such that the outer support post 52 passes through the slot opening 152 and into the engaging slot 150 as shown in FIG. 5 such that the spreader member 120 is in an engaged position relative to the support posts 52 and 54.

In the engaged position, rearward loads on the support portion 136 as shown by arrow A1 in FIG. 5 will apply a force on the space portion 132 that causes slight pivoting of the spreader member 120 to pivot about the outer support post 52. However, the inner finger portion 146 engages the inner post 54 to limit such pivoting movement. So long as even a neutral or slight rearward load is applied to support portion 136 of the spreader member 120 in the engaged position, the spreader member 120 will remain in the engaged position. During normal use of the example cargo area protection system 20, the sheet member 70 and any load 28 supported thereby will typically maintain at least a slight rearward load on the support portion 136 of the spreader member 120. Accordingly, the example spreader member 120 will support the first upper corner edge 64 in a desired position outward of the outer support post 52 to arrange the sheet member 70 in a desired orientation during transportation of the load 28.

To remove the spreader member 120 from the support posts 52 and 54, the load on the support portion 136 is removed or overcome by deliberate application of manual force to the spreader member 120 in the direction shown by arrow B in FIG. 5. The outer support post 52 will first exit the engaging slot 150 through the slot opening 152, after which the spreader member 120 can be displaced such that the inner support post 54 exits the engaging slot 150 through the slot opening 152.

The engaging slot 150 and slot opening 152 of the example spreader member 120 are sized and dimensioned to allow the example spreader member 120 to be adapted to different head restraints with different distances between the outer and inner support posts. In addition, the example slot opening 152 may be spaced from the outer end portion 144 of the engaging portion 134 to allow the spreader member 120 to be shifted as shown by arrow C in FIG. 5 to adjust an exact location of the support portion 136 relative to the first side wall 32 of the vehicle 22. For example, the spreader member 120 may be slid outward relative to the head restraint 42 to a point where the position of the first upper corner edge 64 is optimized without interfering of operation of a seat belt (not shown) associated with the left seat assembly 26a.

The exact details of the example support portion 136 are not essential to the principles of the present invention. As perhaps best shown in FIG. 6A, the example support portion 136 comprises a peg 160 and a disk 162. In the example spreader member 120, the peg 160 and disk 162 are integrally formed with the spacer body 130. The example peg 160 spaces the disk 162 from the spacer portion 132 of the first spacing member 120, and a diameter of the disk 162 is slightly larger than that of the peg 160. A loop, eyelet, strap, or other form of the first sheet connectors 72 may be engaged with the support portion 136 such that inadvertent disengagement of the example first sheet connector 72 from the support portion 136 is inhibited. In the example depicted in FIG. 5, the example first sheet connector 72 is a hole or eyelet formed adjacent to the first upper corner edge 64. The hole forming the example first sheet connector 72 is sized and dimensioned to receive the disk 162 and engage the peg 160 such that the disk 162 extends over a portion of the sheet member 70 around the hole to inhibit inadvertent removal of the example first sheet connector 72 from the support portion 136.

FIG. 3 further illustrates that the pockets 76 are sewn to the inner end section 86 of the sheet member 70 and are sized and dimensioned to receive the head restraints 42 of the seat assemblies 26a and 26b. The pockets 76 provide additional support for holding the sheet member 70 in its desired configuration but are optional and may be omitted from the example cargo area protection system 20 of the present invention.

Figure 6A:
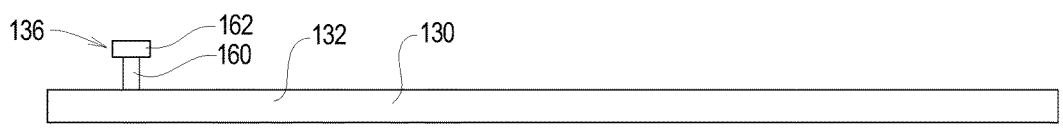
FIG. 6A is a rear elevation view of a portion of a first example spreader member forming a part of the first example spreader system.
Figure 6B:
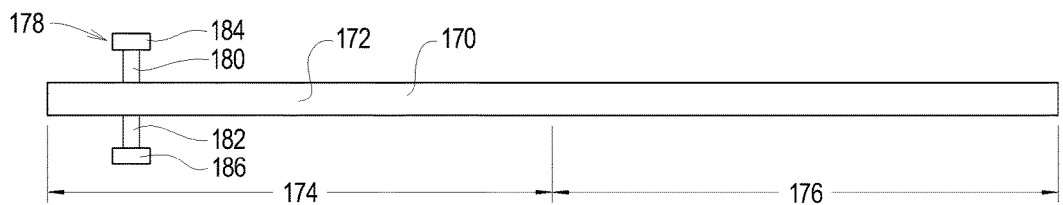
FIG. 6B is a rear elevation view of a portion of a second example spreader member that may be used to form a spreader system of the present invention.

Referring now to FIG. 6B of the drawing, depicted therein is another example spreader member 170 that may be used as part of the first example spreading system 62. The example spreader member 170 comprises a spreader body 172 defining a spacer portion 174, an engaging portion 176, and a support portion 178. The example support portion 178 comprises first and second pegs 180 and 182 and first and second disks 184 and 186 supported by the pegs 180 and 182, respectively. The support portion 178 functions in the same general manner as the support portion 136 described above but the pegs 180 and 182 extend in opposite directions from the spacer portion 174. The example spreader member 170 allows one type of spreader member to be used on both the left seat assembly 26a and on the right seat assembly 26b.

Figure 7:
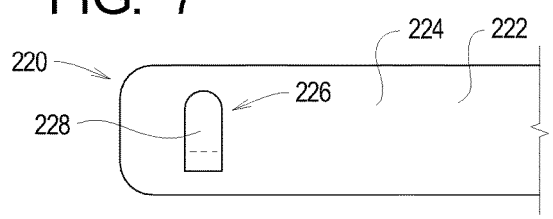
FIG. 7 is a top plan view of a portion of a third example spreader member that may be used to form a spreader system of the present invention.
Figure 8:
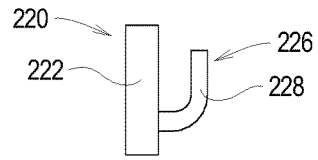
FIG. 8 is a side elevation view of a portion of the third example spreader member that may be used to form a spreader system of the present invention.

Referring now to FIGS. 7 and 8 of the drawing, depicted therein is another example spreader member 220 that may be used as part of the first example spreading system 62. The example spreader member 220 comprises a spreader body 222 defining a spacer portion 224, an engaging portion (not visible), and a support portion 226. The engaging portion may be the same as any engaging portion depicted herein. As perhaps best shown in FIG. 8, the example support portion 226 comprises an L-shaped hook member 228 that extends up and forward from the spacer portion 224 during normal use of the example spreader member 220. The support portion 226 functions in the same general manner as the support portion 136 described above to engage the example first sheet connectors 72 or variations thereof as described herein.

Figure 11:
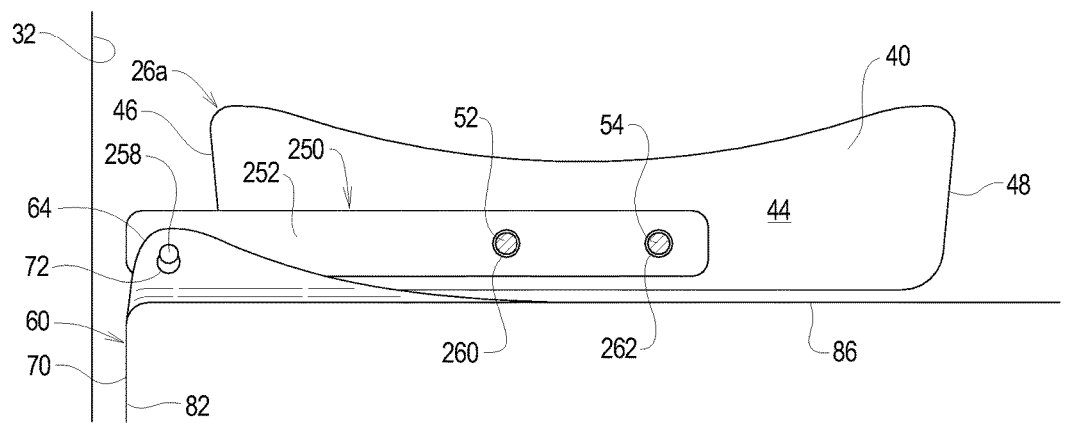
FIG. 11 is a top plan cutaway view of the second example spreader system.
Figure 12:
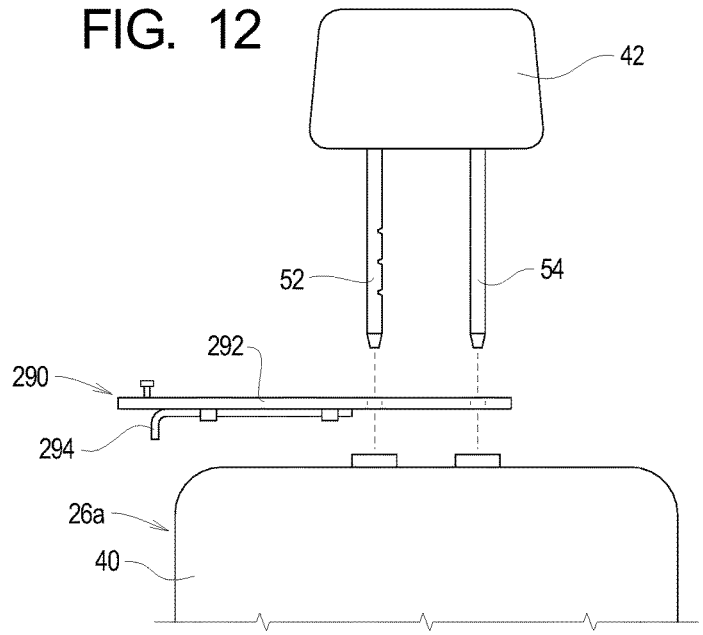
FIG. 12 is a rear elevation exploded view of a third example spreader system that may be used to form part of an example cargo area protection system of the present invention.
Figure 13:
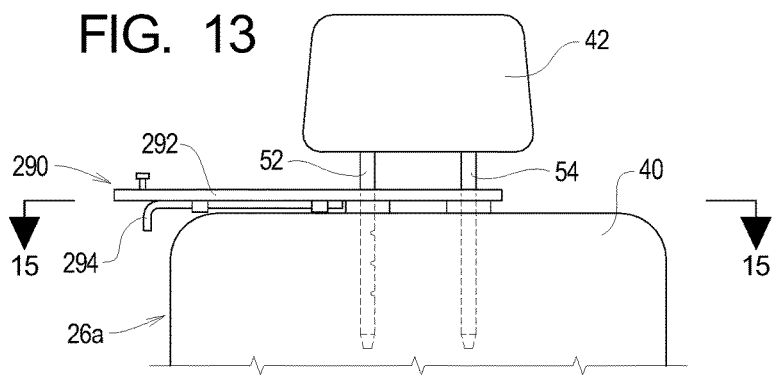
FIG. 13 is a rear elevation assembled view of the third example spreader system.
Figure 14:
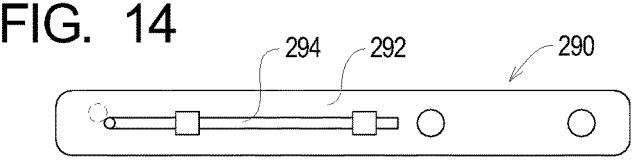
FIG. 14 is a bottom plan view of a first example spreader assembly that may be used to form the third example spreader system.

Referring now to FIGS. 9, 10A, and 11 of the drawing, depicted therein is another example spreader member 250 that may be used as part of the first example spreading system 62. The example spreader member 250 comprises a spreader body 252 defining a spacer portion 254, an engaging portion 256, and a support portion 258. The support portion 258 is similar to the support portion 136 described above, but any of the support portions described herein may be used with the example spreader member 250.

As perhaps best shown in FIGS. 10A and 11, the example engaging portion 256 comprises first and second openings 260 and 262. The first and second openings 260 and 262 are sized, dimensioned, and spaced from each other to receive the outer and inner support posts 52 and 54 as shown in FIG. 11. FIG. 9 illustrates the head restraint 42 is detached from the seat back 40. The outer and inner seat posts 52 and 54 are then inserted through the first and second openings 260 and 262, respectively, and then into first and second seat post sockets 270 and 272 in the seat back 40 such that the support portion 258 is spaced outwardly from the outer support post 52.

In this configuration as shown in FIG. 11, the first sheet connector 72 at the first upper corner edge 64 of the sheet member 70 is supported in a desired position. Accordingly, when installed, the example engaging portion 256 functions in the same general manner as the engaging portion 134 described above to support the support portion 258 relative to the head restraint 42.

FIG. 10B illustrates another example spreader member 280 comprising first and second openings 282 and 284. The first opening 282 takes the form of an elongate slot, and the second opening 284 is similar to the second opening 262. The use of an elongate slot allows the example spreader member 280 to accommodate head restraints having different spacing distances between the outer and inner support posts.

Figure 15:
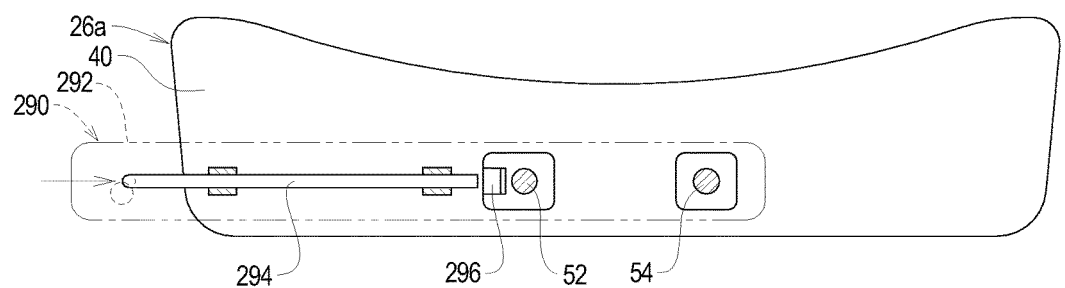
FIGS. 15 and 16 are top plan cutaway views illustrating the use of the first example spreader assembly to facilitate the removal of a headrest.
Figure 16:
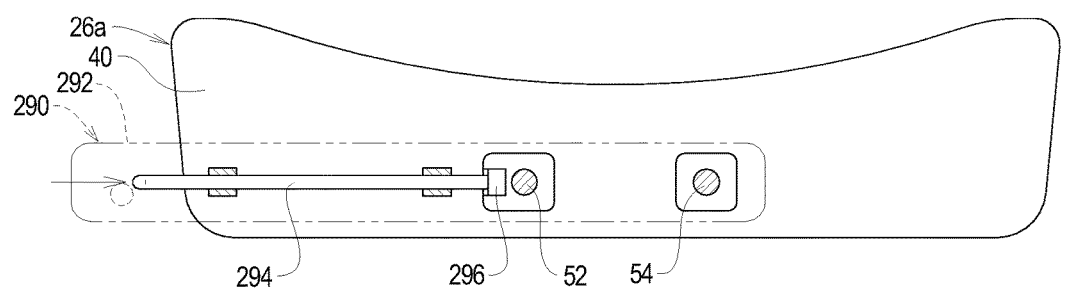

FIGS. 12-16 illustrate an example spreader assembly 290 comprising a spreader member 292 and an actuator member 294. The example spreader member 292 is or may be the same as the example spreader members 250 and 280 described above and will not be described again in further detail. Many head restraints are adjustable, and such adjustable head restraints employ a latch button. A latch button 296 is depicted in FIGS. 15 and 16. When the spreader assembly 290 is in the engaged position relative to the support posts 52 and 54, access to the latch button 296 is restricted by the spreader member 292. The example actuator member may be displaced from an outer position (FIG. 15) to an inner position (FIG. 16) to operate the latch button 296.

Figure 17:
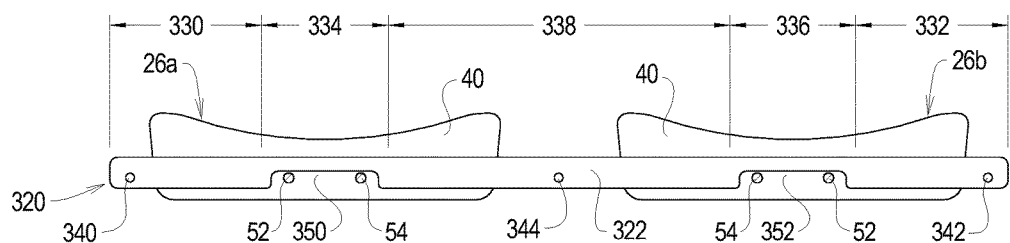
FIG. 17 is a top plan cutaway view depicting a fourth example spreader system of the present invention employing a sixth example spreader member.

Referring now to FIG. 17, depicted therein is another example spreader member 320 of the present invention. The example spreader member 320 comprises a spreader body 322 defining first and second spacer portions 330 and 332, first and second engaging portions 334 and 336, a central portion 338, first and second end support portions 340 and 342, and a intermediate support portion 344. The first and second engaging portions 334 and 336 are configured to engage the head restraints 42 of the left and right seat assemblies 26a and 26b. The first and second spacer portions 330 and 332 are supported by the first and second engaging portions 334 and 336 to extend outwardly from the outer support posts 52 of the head restraints 42 of the left and right seat assemblies 26a and 26b.

FIG. 17 further illustrates that the example engaging portions 334 and 336 define first and second notches 350 and 352, respectively. The first and second notches 350 and 352 are sized and dimensioned to receive the support posts 52 and 54 of the head restraints 42 of the left and right seat assemblies 26a and 26b, respectively. The notches 350 and 352 inhibit lateral movement of the spreader member 320 when in the engaged position as shown in FIG. 17. The example middle central portion 338 is sized and dimensioned to extend between the example engaging portions 334 and 336 when the spreader member 320 is in its engaged position.

The spacer portions 330 and 332 extend outwardly from the engaging portions 334 and 336 such that the first and second support portions 340 and 342 are supported adjacent to the first and second side walls 32 and 34 of the vehicle 22. The intermediate support portion 344 is supported by the central portion 338 between the first and second support portions 340 and 342. The support portions 340, 342, and 344 may take the same form as any of the support portions described herein. The first and second support portions 340 and 342 are each configured to engage one of the first sheet connectors 72 located at the first and second upper corner edges 64 and 66 of the sheet assembly 60. The intermediate support portion is arranged at a location along the upper edge of the inner end section 86 of the sheet member 70 to support the inner end section 86 between the first and second upper corner edges 64 and 66.

Figure 18:
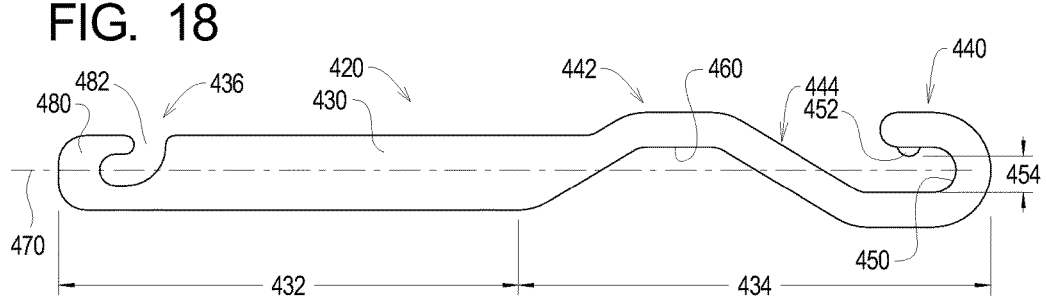
FIG. 18 is a top plan view of a seventh example spreader member of the present invention.
Figure 19:
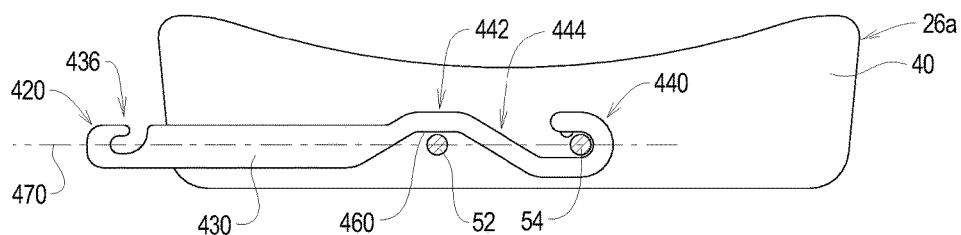
FIGS. 19 and 20 are top plan cutaway views illustrating the seventh example spreader member being used in first and second configurations, respectively, to form a part of a spreader system of an example cargo area protection system of the present invention.
Figure 20:
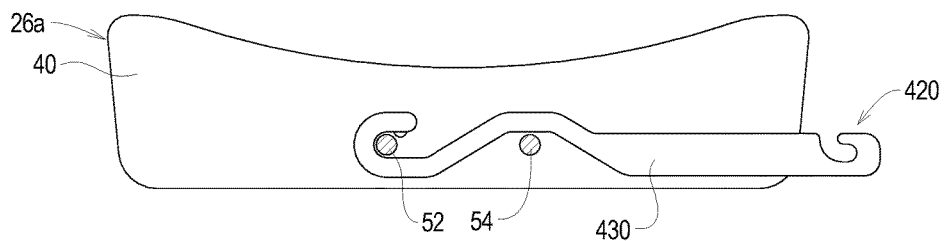

Turning now to FIGS. 18-20, depicted therein is another example spreader member 420 that may be used to form the example cargo area protection system 20 as depicted in FIG. 1. The example spreader member 420 comprises a spreader body 430 defining a spacer portion 432, an engaging portion 434, and a support portion 436. The example engaging portion 434 comprises an inner engaging portion 440, an outer engaging portion 442, and a connecting portion 444 extending between the inner engaging portion 440 and the outer engaging portion 442. The example inner engaging portion 440 takes a generally semi-circular form and defines a curved surface 450. A lock projection 452 extends from the curved surface 450 to define a lock gap 454. The example outer engaging portion 442 defines a bearing surface 460. The example spreader member 420 defines a longitudinal axis 470 extending through the curved surface 450, the lock gap 454, and the support portion 436. The example bearing surface 460 is offset from the longitudinal axis 470. The example support portion 436 is formed with a hook 480 integrally formed into the spacer portion 432. The example hook 480 defines a hook opening 482 that faces forward when the example spreader member 420 is in its engaged position as will be described below.

To arrange the example spreader member 420 in its engaged position, the spreader member is displaced such that the inner engaging portion 440 passes between the outer and inner support posts 52 and 54 with the lock gap 454 facing the inner support post 54. The spreader member 420 is then displaced such that the inner support post 54 passes through the lock gap 454. The example spreader member 420 is made of resilient material and the length of the lock gap 454 is slightly smaller than a diameter of the inner support post 54. The lock projection 452 thus resiliently deflects to allow the inner support post 54 to pass through the lock gap 454 and then returns to its original position. In its original position, the lock projection 452 inhibits inadvertent removal of the inner support post 54 through the lock gap 454. The example spreader member 420 may be removed through the lock gap 454 by deliberate application of manual force.

After the inner support post 54 is passed through the lock gap 454, the inner support post 54 engages the curved surface 450. The spreader member 420 may be rotated about an axis defined by the inner support post 54 until the bearing surface 460 bears on the outer engaging portion 442. The bearing surface 460 is elongated to allow the example spreader member to be used with head restraints having support posts of different spacing.

The example spreader member 420 is symmetrical in rotation. Accordingly, the spreader member 420 as shown in FIGS. 19 and 20 may be flipped over and still function in the same manner. The example spreader member 420 is thus configured to be supported by either the outer and inner support posts 52 and 54 of the left seat assembly 26a as shown in FIG. 19 or by the outer and inner support posts 52 and 54 of the right seat assembly 26b as shown in FIG. 20. The example support portion 436 thus may be attached to either of the first and second upper corner edges 64 and 66 and support these corner edges 64 and 66 to hold the sheet member 70 in its desired configuration relative to the cargo area 24.

As shown in FIGS. 19 and 20, the hook opening 482 faces forward in either orientation of the spreader member 420. Rearward loads on the hook 480 are thus transferred to the inner support post 54 through the inner engaging portion 440 and to the outer support post 52 through the outer engaging portion 442.

FIGS. 21-24 show several examples of sheet connectors that may be used as the first and second sheet connectors 72 and 74 of the sheet assembly 60.

Figure 21:
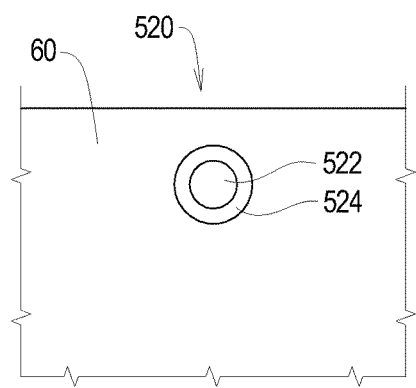
FIG. 21 is a top plan view of portion of a first example sheet member comprising a first example sheet connector that may be used as part of a cargo area protection system of the present invention.

A first type of sheet connector 520 depicted in FIG. 21 is a simple eyelet. An eyelet is formed by forming a hole 522 in the sheet material and then reinforcing the hole with a rigid ring 524 that distributes loads to the sheet material to reduce tearing of the sheet material.

Figure 22:
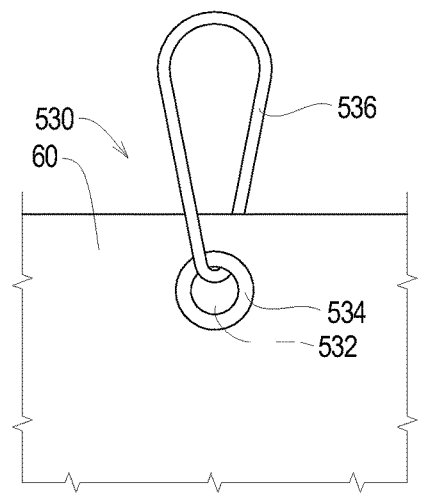
FIG. 22 is a top plan view of portion of a second example sheet member comprising a second example sheet connector that may be used as part of a cargo area protection system of the present invention.

A second type of sheet connector 530 depicted in FIG. 22 is formed by an eyelet and loop. The eyelet is formed by forming a hole 532 in the sheet material and reinforcing the hole 532 with a rigid ring 534. A loop 536 of string, rope, or wire is then extended through the hole 532 and rigid ring 534. The ring 534 distributes loads to the sheet material to reduce tearing of the sheet material, and the loop 536 facilitates attachment to a load member such as any of the support portions described herein.

Figure 23:
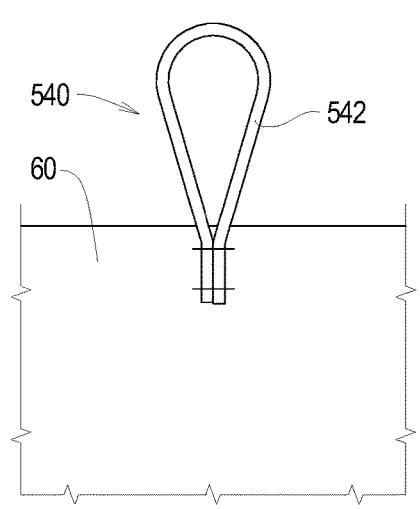
FIG. 23 is a top plan view of portion of a third example sheet member comprising a third example sheet connector that may be used as part of a cargo area protection system of the present invention.

A third type of sheet connector 540 depicted in FIG. 23 is formed by a loop. In particular, a loop 542 of string, rope, or wire is sewn directly to the sheet material. The loop 542 facilitates attachment of a load member such as any of the support portions described herein to the sheet material.

Figure 24:
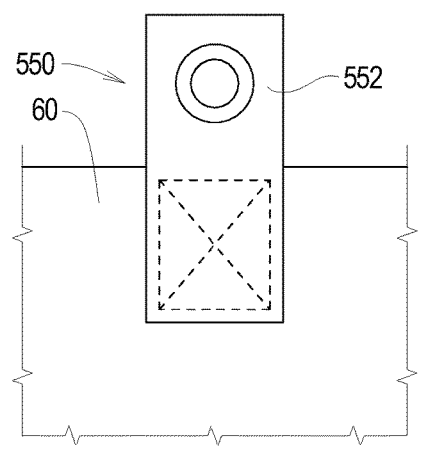
FIG. 24 is a top plan view of portion of a fourth example sheet member comprising a fourth example sheet connector that may be used as part of a cargo area protection system of the present invention.

A fourth type of sheet connector 550 depicted in FIG. 24 is formed by a strap. In particular, a strap 552 of banding or the like is folded over and sewn directly to the sheet material. The strap 552 facilitates attachment of a load member such as any of the support portions described herein to the sheet material.

Figure 25:
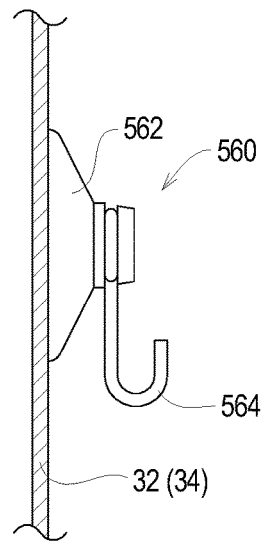
FIG. 25 is a side elevation section view of a first example hard surface connector that may be used as part of a cargo area protection system of the present invention.
Figure 26:
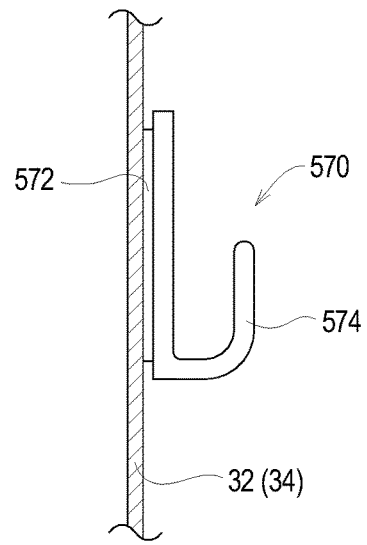
FIG. 26 is a side elevation section view of a second example hard surface connector that may be used as part of a cargo area protection system of the present invention.
Figure 27:
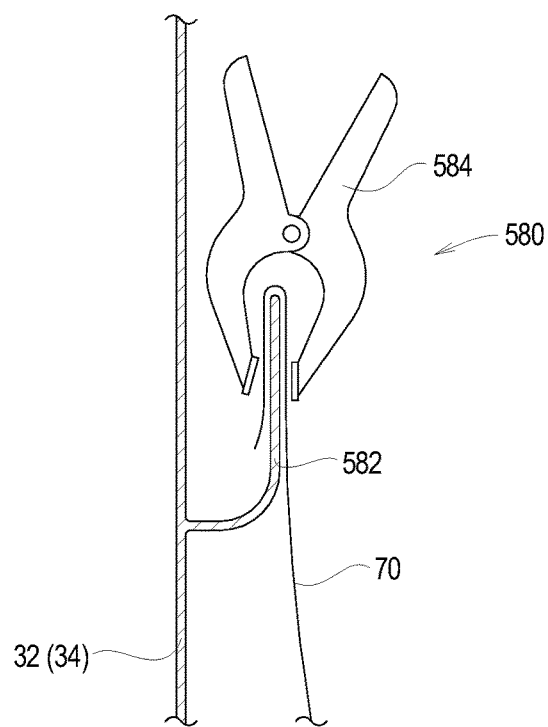
FIG. 27 is a side elevation section view of a third example hard surface connector that may be used as part of a cargo area protection system of the present invention.

FIGS. 25-27 show several examples of solid surface connectors that may be used as the attachment locations 68 to which the side sections 82 and 84 of the sheet member 70 are attached.

A first type of solid surface connector 560 depicted in FIG. 25 is a suction hook. A suction cup 562 is secured to a surface (e.g., window glass) defining or adjacent to the side walls 32 and 34 of the vehicle 22. A hook 564 is suspended from the suction cup 562. The suction cup 562 supports the hook 564 at a desired location, and the hook 564 facilitates attachment to an attachment member such as any of the sheet connectors described herein.

A second type of solid surface connector 570 depicted in FIG. 26 is an adhesive hook. An adhesive layer 572 is secured to a surface (e.g., window glass) defining or adjacent to the side walls 32 and 34 of the vehicle 22. A hook 574 is attached to the adhesive layer 572. The adhesive layer 572 supports the hook 574 at a desired location, and the hook 574 facilitates attachment to an attachment member such as any of the sheet connectors described herein.

A third type of solid surface connector 580 depicted in FIG. 27 is clamp. A typical vehicle interior may define a rigid surface 582 such as a storage compartment wall located at an appropriate position to support the side sections 82 and 84 of the sheet member 70. The sheet material 70 is arranged over the rigid surface 582, and a clamp 584 is used to clamp the sheet material 70 to the rigid surface 582. The use of a clamp such as the clamp 584 obviates the need for a separate attachment member such as any of the sheet connectors described herein to allow the sheet member 70 to be secured to at least some of the attachment locations 68.

What is claimed is:

1. A cargo area protection system for a vehicle defining a cargo area and a forward direction and comprising first and second seat assemblies and first and second side walls, where the first seat assembly comprises a first outer support post and a first inner support post and defines a first outer side surface, the second seat assembly comprises a second outer support post and a second inner support post and defines a second outer side surface, the first side wall is adjacent to the first seat assembly, and the second side wall is adjacent to the second seat assembly, the cargo area protection system comprising:
    a sheet member defining first and second corner portions;
    a substantially planar, substantially rigid first spreader member defining a first spacer portion, a first engaging portion, and a first support portion, where the first support portion comprises a first hook defining a first hook opening; and
    a substantially planar, substantially rigid second spreader member defining a second spacer portion, a second engaging portion, and a second support portion, where the second support portion comprises a second hook defining a second hook opening; wherein
    the first engaging portion is arranged to engage the first outer support post and the first inner support post such that the first hook opening faces the forward direction;
    the second engaging portion is arranged to engage the second outer support post and the second inner support post such that the second hook opening faces the forward direction;
    the first hook supports the first corner of sheet member;
    the second hook supports the second corner of sheet member between the second seat assembly and the second side wall;
    the first spacer portion spaces the first support portion from the first engaging portion such that the first corner of the sheet member is arranged at a first location between the first outer side surface and the first side wall; and
    the second spacer portion spaces the second support portion from the second engaging portion such that the second corner of the sheet member is arranged at a second location between the second outer side surface and the second side wall.

2. A cargo area protection system as recited in claim 1, in which the first seat assembly comprises a head restraint defining the first and second support posts and the second seat assembly comprises a second head restraint defining the third and fourth support posts.

3. A cargo area protection system as recited in claim 1, in which:
    the first engaging portion defines
        a first inner engaging portion adapted to engage the first inner support post; and
        a first outer engaging portion adapted to engage the first outer support post; and
    the second engaging portion defines
        a second inner engaging portion adapted to engage the second inner support post; and
        a second outer engaging portion adapted to engage the second outer support post.

4. A cargo area protection system as recited in claim 3, in which:
    the first inner engaging portion defines a first inner engaging surface that engages at least a portion of the first inner support post;
    the first outer engaging portion defines a first outer bearing surface that engages at least a portion of the first outer support post;
    the second inner engaging portion defines a second inner engaging surface that engages at least a portion of the second inner support post; and
    the second outer engaging portion defines a second outer bearing surface that engages at least a portion of the second outer support post.

5. A cargo area protection system as recited in claim 4, in which:
    the first inner engaging surface defines a first lock gap;
    the first inner engaging portion deforms from an un-deformed position to allow the first inner support post to pass through the first lock gap and returns to the un-deformed position to inhibit withdrawal of the first inner support post through the first lock gap;
    the second inner engaging surface defines a second lock gap; and
    the second inner engaging portion deforms from an un-deformed position to allow the second inner support post to pass through the second lock gap and returns to the un-deformed position to inhibit withdrawal of the second inner support post through the second lock gap.

6. A cargo area protection system as recited in claim 1, further comprising:
    a first sheet connector for detachably attaching the first corner of the sheet member to the first support portion; and
    a second sheet connector for detachably attaching the second corner of the sheet member to the second support portion.

7. A method of protecting a cargo area of a vehicle defining a forward direction comprising a first seat assembly comprising a first outer support post and a first inner support post and defining a first outer surface, a second seat assembly comprising a second outer support post and a second inner support post and defining a second outer surface, a first side wall adjacent to the first outer surface, and a second side wall adjacent to the second outer surface, the method comprising the steps of:
provided a sheet member defining first and second corner portions;
providing a substantially planar, substantially rigid first spreader member defining a first spacer portion, a first engaging portion, and a first support portion, where the first support portion comprises a first hook defining a first hook opening;
providing a substantially planar, substantially rigid second spreader member defining a second spacer portion, a second engaging portion, and a second support portion, where the second support portion comprises a second hook defining a second hook opening;
arranging the first engaging portion to engage the first outer support post and the first inner support post such that the first hook opening faces the forward direction;
arranging the second engaging portion to engage the second outer support post and the second inner support post such that the second hook opening faces the forward direction;
arranging the first hook to support the first corner of the sheet member such that the first corner of the sheet member is arranged at a first location between the first outer side surface and the first side wall; and
arranging the second hook to support the second corner of the sheet member such that the second corner of the sheet member is arranged at a second location between the second outer side surface and the second side wall.

8. A method as recited in claim 7, in which:
the first seat assembly comprises a first head restraint comprising the first outer support post and the first inner support post; and
the second seat assembly comprises a second head restraint comprising the second outer support post and the second inner support post.

9. A cargo area protection system as recited in claim 1, in which:
the first engaging portion defines a first lock gap;
the first engaging portion deforms from an un-deformed position to allow the first inner support post to pass through the first lock gap and returns to the un-deformed position to inhibit withdrawal of the first inner support post through the first lock gap;
the second engaging portion defines a second lock gap;
the second engaging portion deforms from an un-deformed position to allow the second inner support post to pass through the second lock gap and returns to the un-deformed position to inhibit withdrawal of the second inner support post through the second lock gap.

10. A cargo area protection system as recited in claim 1, in which the first and second spreader members are identical.

11. A method as recited in claim 7, in which the first engaging portion defines a first inner engaging portion and a first outer engaging portion and the second engaging portion defines a second inner engaging portion and a second outer engaging portion, the method further comprising the steps of:
arranging the first inner engaging portion to engage the first inner support post;
arranging the first outer engaging portion engage the first outer support post;
arranging the second inner engaging portion to engage the second inner support post; and
arranging the second outer engaging portion to engage the second outer support post.

12. A method as recited in claim 11, in which the first inner engaging portion defines a first inner engaging surface, the first outer engaging portion defines a first outer bearing surface, the second inner engaging portion defines a second inner engaging surface, and the second outer engaging portion defines a second outer bearing surface that engages at least a portion of the second outer support post, the method further comprising the steps of:
arranging first inner engaging surface to engage at least a portion of the first inner support post;
arranging the first outer bearing surface to engage at least a portion of the first outer support post;
arranging the second inner engaging surface to engage at least a portion of the second inner support post; and
arranging the second outer bearing surface to engage at least a portion of the second outer support post.

13. A method as recited in claim 7, in which the first engaging portion defines a first lock gap and the second engaging portion defines a second lock gap, the method further comprising the steps of:
displacing the first inner post through the first lock gap such that the first engaging portion deforms from an un-deformed position to allow the first inner support post to pass through the first lock gap and returns to the un-deformed position to inhibit withdrawal of the first inner support post through the first lock gap;
displacing the second inner post through the second lock gap such that the second engaging portion deforms from an un-deformed position to allow the second inner support post to pass through the second lock gap and returns to the un-deformed position to inhibit withdrawal of the second inner support post through the second lock gap.

14. A method as recited in claim 7, in which in which the first and second spreader members are the identical.

* * * * *